(12) United States Patent
Hu et al.

(10) Patent No.: US 10,480,735 B2
(45) Date of Patent: Nov. 19, 2019

(54) MAGNETIC LEVITATION IMITATION FLAME DEVICE AND IMITATION FLAME LAMP

(71) Applicants: Wei Hu, Shenzhen (CN); Chao Li, Shenzhen (CN)

(72) Inventors: Wei Hu, Shenzhen (CN); Chao Li, Shenzhen (CN)

( * ) Notice: Subject to any disclaimer, the term of this patent is extended or adjusted under 35 U.S.C. 154(b) by 0 days.

(21) Appl. No.: 16/046,790

(22) Filed: Jul. 26, 2018

(65) Prior Publication Data

US 2018/0372289 A1    Dec. 27, 2018

(30) Foreign Application Priority Data

Mar. 16, 2018   (CN) .......................... 2018 1 0220664

(51) Int. Cl.
*F21S 10/04*    (2006.01)
*H02N 15/00*    (2006.01)

(52) U.S. Cl.
CPC ............ *F21S 10/046* (2013.01); *H02N 15/00* (2013.01)

(58) Field of Classification Search
CPC ................................ F21V 10/046; F21V 10/04
See application file for complete search history.

(56) References Cited

U.S. PATENT DOCUMENTS

| 2015/0292697 A1* | 10/2015 | Lai | ........................ F21S 10/046 362/286 |
| 2016/0053954 A1* | 2/2016 | Lai | ........................ F21S 10/046 362/393 |
| 2017/0082256 A1* | 3/2017 | Li | .......................... F21S 6/001 |

* cited by examiner

*Primary Examiner* — Anh T Mai
*Assistant Examiner* — Zachary J Snyder
(74) *Attorney, Agent, or Firm* — Shimokaji IP

(57) ABSTRACT

A magnetic levitation imitation flame device includes a mounting base, a flame member, a positioning bracket, a first magnet, and a second magnet. The positioning bracket is fixed in the mounting base. The first magnet is disposed on the flame member. The flame member is disposed on the positioning bracket and protrudes outwards from the mounting base. The second magnet is fixed at a lower end of the positioning bracket. The first magnet and the second magnet are arranged up and down. Magnetic poles thereof facing each other have same polarity so that the flame member is levitated relative to the positioning bracket under a repulsive force of the first magnet and the second magnet. Thus, the flame member swings with big angle, naturally and realistically, and saves electric energy. In addition, an imitation flame lamp is also provided.

8 Claims, 6 Drawing Sheets

… (1)

MAGNETIC LEVITATION IMITATION FLAME DEVICE AND IMITATION FLAME LAMP

RELATED APPLICATIONS

This application claims the benefits of Chinese Patent Application No. 201810220664.7, filed on Mar. 16, 2018, which is hereby incorporated by reference in this application.

FIELD OF THE INVENTION

The present invention relates to an imitation flame device, and more particularly to a magnetic levitation imitation flame device and an imitation flame lamp with a magnetic levitation imitation flame device.

BACKGROUND OF THE INVENTION

Currently, for creating ambience in certain occasions, people often use imitation candle lamps to imitate actual candle flame effect. A conventional imitation candle lamp commonly utilizes a flame piece supported on the lamp head, an illuminator emitting light to the flame piece, and a drive device for driving the flame piece to swing, thereby obtaining faux flame effect. However, the flame piece is supported on the lamp head by a wire, and the flame piece may swing at small amplitude due to its swing is limited by the wire. Thus the imitation effect is stiff and not lifelike. Besides, when the flame piece is mounted on the lamp head by a wire, friction occurs with the wire. Each time the drive device drives the flame piece, the flame piece can only swing once or twice because of friction, and then the drive device is required. When power is frequently turned on, which will result in consuming a large amount of electric energy, and the battery life of the imitation flame lamp is short, and it is not environmentally friendly.

SUMMARY OF THE INVENTION

One objective of the present invention is to provide a magnetic levitation imitation flame device which swings with big angle naturally and realistically, and saves electric energy.

Another objective of the present invention is to provide an imitation flame lamp which swings with big angle, naturally and realistically, and saves electric energy.

To achieve the mentioned above objectives, a magnetic levitation imitation flame device includes a mounting base, a flame member, a positioning bracket, a first magnet, and a second magnet. The positioning bracket is fixed in the mounting base. The first magnet is disposed on the flame member. The flame member is disposed on the positioning bracket and protrudes outwards from the mounting base. The second magnet is fixed at a lower end of the positioning bracket. The first magnet and the second magnet are arranged up and down. Magnetic poles of the second magnet and the first magnet facing each other have same polarity so that the flame member is levitated relative to the positioning bracket under a repulsive force between the first magnet and the second magnet.

In comparison with the prior art, a first magnet is disposed on the flame member, the flame member is disposed on the positioning bracket, and the second magnet is fixed at a lower end of the positioning bracket. Magnetic poles of the second magnet and the first magnet facing each other have same polarity, so that the flame member is levitated relative to the positioning bracket under a repulsive force between the first magnet and the second magnet. Since the flame member is levitated and only controlled by the positioning shaft, the flame member can swings with big angle towards all directions. Besides, in the suspended state, the flame member is not blocked by other forces, so the swing is more natural and realistic, and the flame member looks like an actual flaming and flickering candle under a breeze. In addition, each time the flame member is driven to swing, the flame member can swing with inertial force more lastingly, thereby effectively reducing driving, saving energy, extending battery life and protecting the environment.

Preferably, either of the positioning bracket and the flame member has a positioning shaft arranged vertically, and the other one of them is provided with a positioning hole for receiving the positioning shaft.

Preferably, an elongated hole is defined in the flame member, and the positioning shaft passes through the positioning hole into the elongated hole. The positioning shaft can be seen from the outside and looks like a flame wick, so that the imitation effect is better and more realistic.

Preferably, the positioning bracket further has a supporting rod, the positioning shaft is formed at an upper end of the supporting rod, and the second magnet is arranged in an opening of the bottom surface of the supporting rod.

Preferably, the flame member is provided with an elongated slot, one end of the elongated slot is a mounting hole for accommodating the first magnet, and the supporting rod is placed in the elongated slot.

Preferably, the flame member includes a flame piece and a rocking part, the flame piece extends downwards to form a connection pin, the rocking part is provided with a connection hole, and the connection pin is inserted into the connection hole so that the flame piece is connected with the rocking part.

An imitation flame lamp includes a shell, a power supply, a circuit board, a drive device, and an illuminant respectively installed in the shell, and a magnetic levitation imitation flame device mentioned above installed in the shell. The flame member is protruded outwards from a top surface of the shell. The circuit board is electrically connected to the power supply through a switch, the illuminant is electrically connected to the circuit board and irradiates light towards the flame member, and the drive device is electrically connected to the circuit board and drives the flame member to swing.

Preferably, the drive device includes a third magnet and a coil. The third magnet is fixed to a lower end of the flame member. The coil is located under the flame member and generates an electromagnetic field under the control of the circuit board to control the flame member to swing.

A bottom surface of the flame member is provided with a fixing hole, and the third magnet is accommodated in the fixing hole.

The shell is a candle shell.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings.

Figure 1:
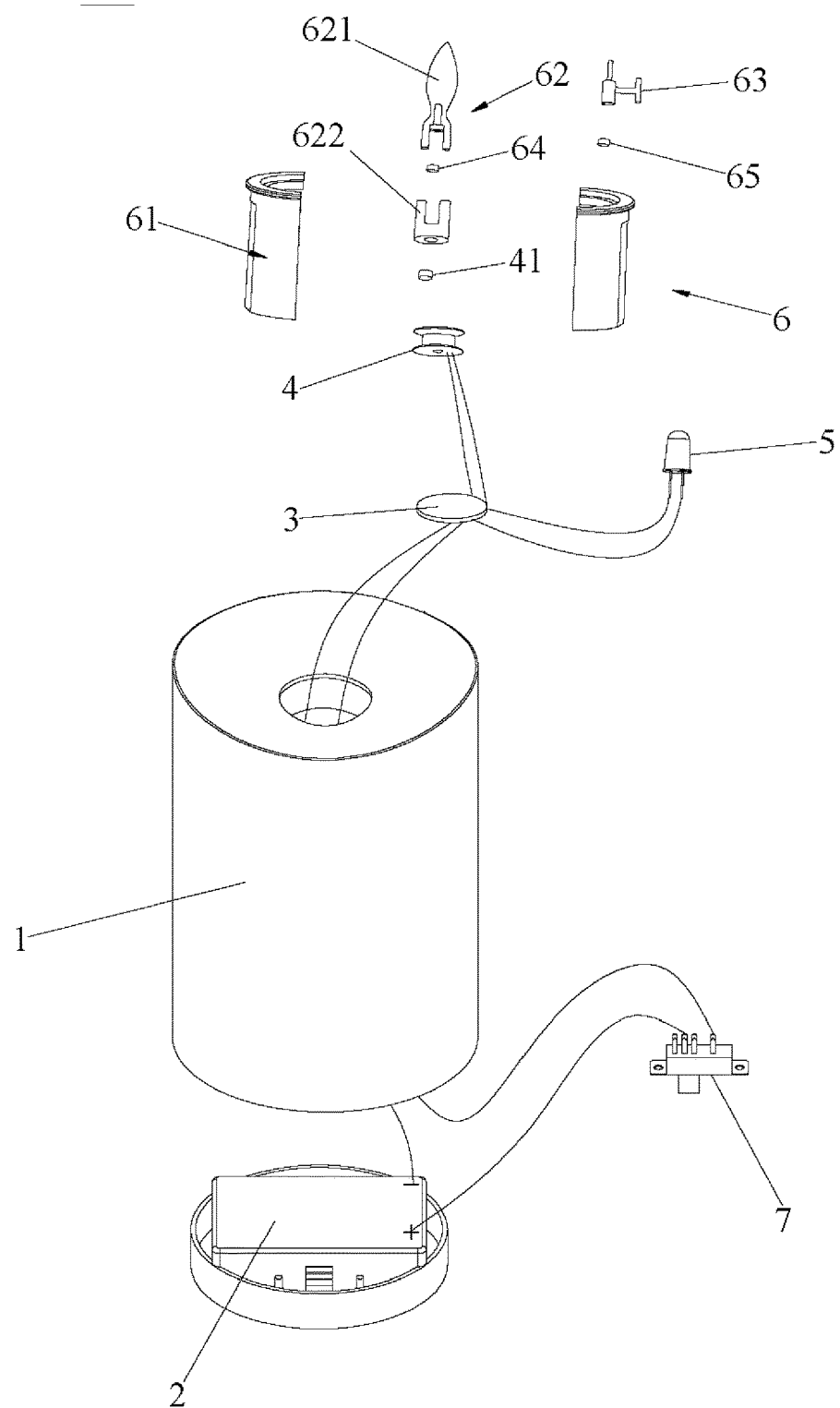
FIG. 1 is an exploded view of an imitation flame lamp according to an embodiment of the present invention.
Figure 2:
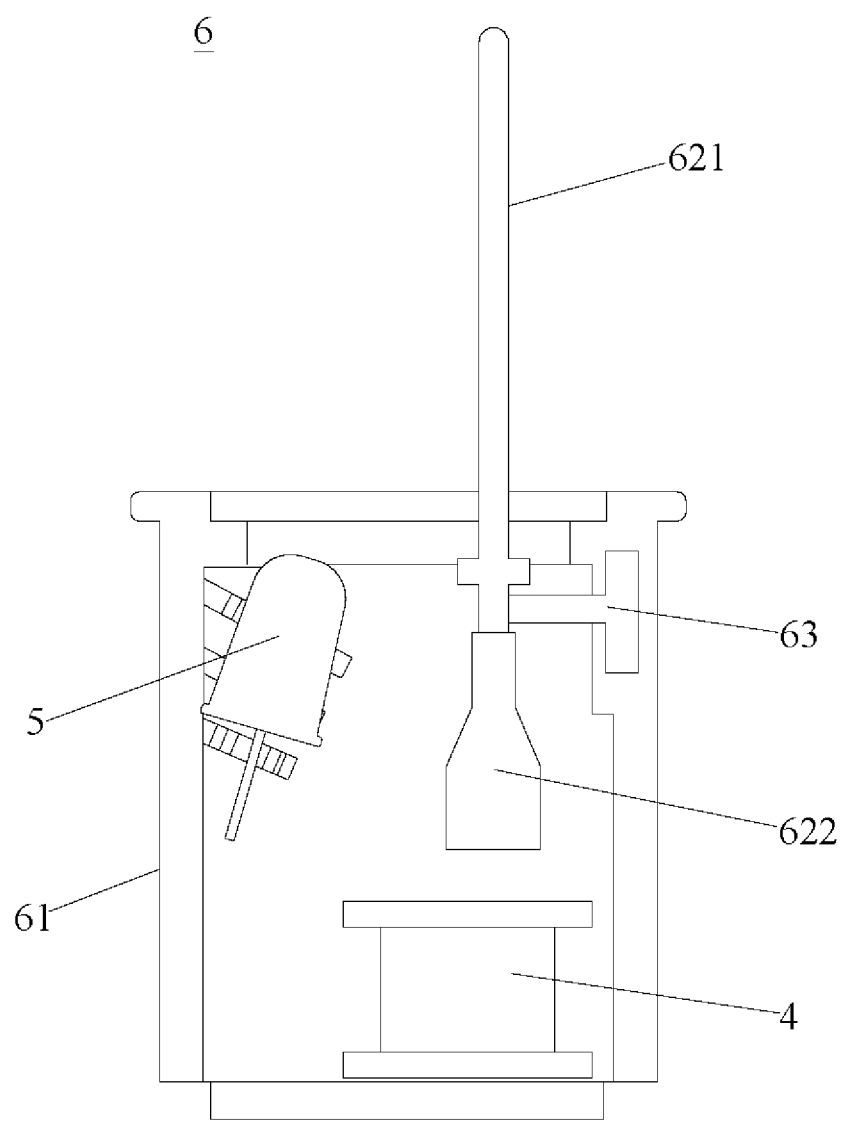
FIG. 2 is a front view of an internal structure of a magnetic levitation imitation flame device according to an embodiment of the present invention.

As illustrated in FIG. 1 and FIG. 2, an imitation flame lamp 100 includes a shell 1, and a power supply 2, a circuit board 3, a drive device 4, an illuminant 5 respectively installed in the shell 1, and a magnetic levitation imitation flame device 6. Specifically, the circuit board 3 is electrically connected to the power supply 2 through a switch 7; the illuminant 5 is electrically connected to the circuit board 3 and irradiates light towards the flame member 62; and the drive device 4 is electrically connected to the circuit board 3 and drives the flame member 62 to swing. Preferably, the shell 1 is a candle shell to display flaming and flickering effect of faux flame to achieve an excellent imitation effect.

As shown in FIGS. 1, 3, and 5-6, the magnetic levitation imitation flame device 6 includes a mounting base 61, a flame member 62, a positioning bracket 63, a first magnet 64, and a second magnet 65. Concretely, the mounting base 61 includes left and right parts which form a whole mounting base 61. The positioning bracket 63 is fixed in the mounting base 61. Specifically, the positioning bracket 63 has a supporting rod 631 vertically disposed, a positioning shaft 632, and a T-shaped connection frame 633 transversely disposed. In detail, the positioning shaft 632 is formed at an upper end of the supporting rod 631. One end of the connection frame 633 is connected to the supporting rod 631, and the other end of the connection frame 633 is connected to an inner side wall of the mounting base 61. The first magnet 64 is disposed on the flame member 62 and provided with a positioning hole 641. The flame member 62 is also provided with another positioning hole (not shown) facing the positioning hole 641 of the first magnet 64. The positioning shaft 632 is sleeved in the positioning hole 641 of the first magnet 64 and the positioning hole of the flame member 62 to position the flame member 62 so that the flame piece 621 of the flame member 62 is exposed on the mounting base 61 and protrudes outwards from an upper end of the shell 1. The second magnet 65 is fixed in an opening of the bottom surface of the supporting rod 631. Magnetic poles of the second magnet 65 and the first magnet 64 facing each other has same polarity so that the flame member 62 is levitated relative to the positioning bracket 63 under a repulsive force of the first magnet 64 and the second magnet 65. Of course, the flame member 62 and the positioning bracket 63 may also be fixed in other manners. For example, the flame member 62 may also be provided with a positioning pillar, and the positioning bracket 63 may also be provided with a positioning hole so that the positioning pillar is sleeved in the positioning hole to position the flame member 62. Then the first magnet 64 is fixed on a lower end of the positioning column. The first magnet 64 in the positioning hole and is mutually repulsive with the second magnet 65 at the bottom of the positioning hole. Similarly, the flame member 62 can be levitated relative to the positioning bracket 63.

Figure 3:
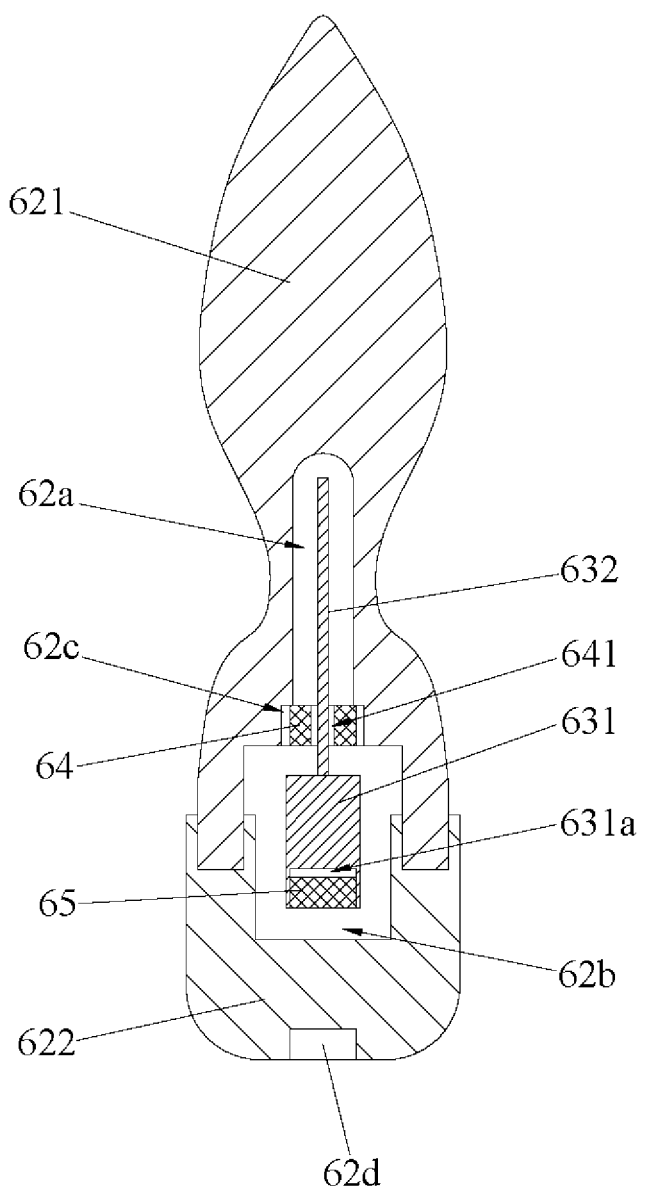
FIG. 3 is a sectional view of the magnetic levitation imitation flame device according to an embodiment of the present invention.
Figure 4:
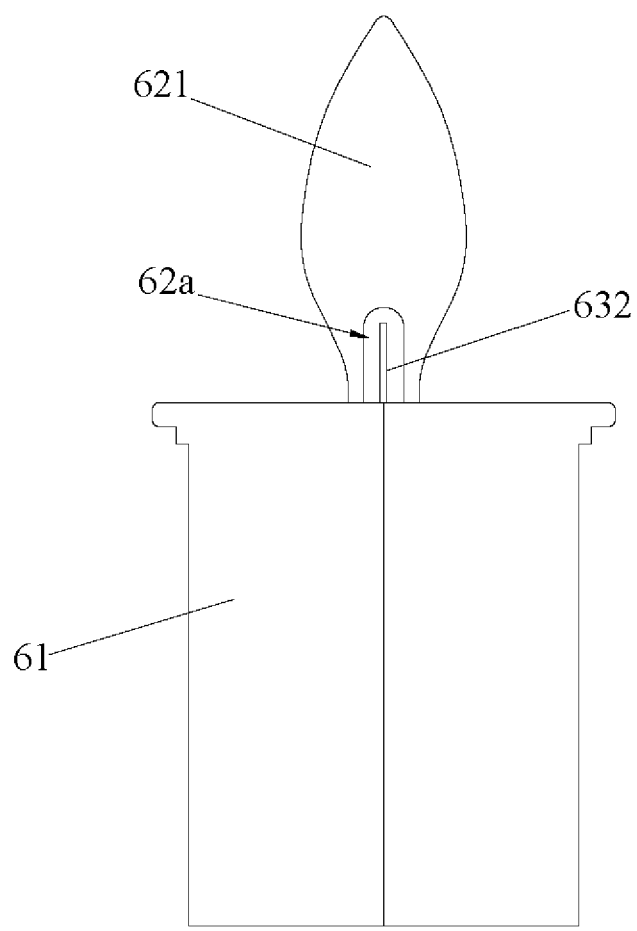
FIG. 4 is a front view of the magnetic levitation imitation flame device according to an embodiment of the present invention.
Figure 5:
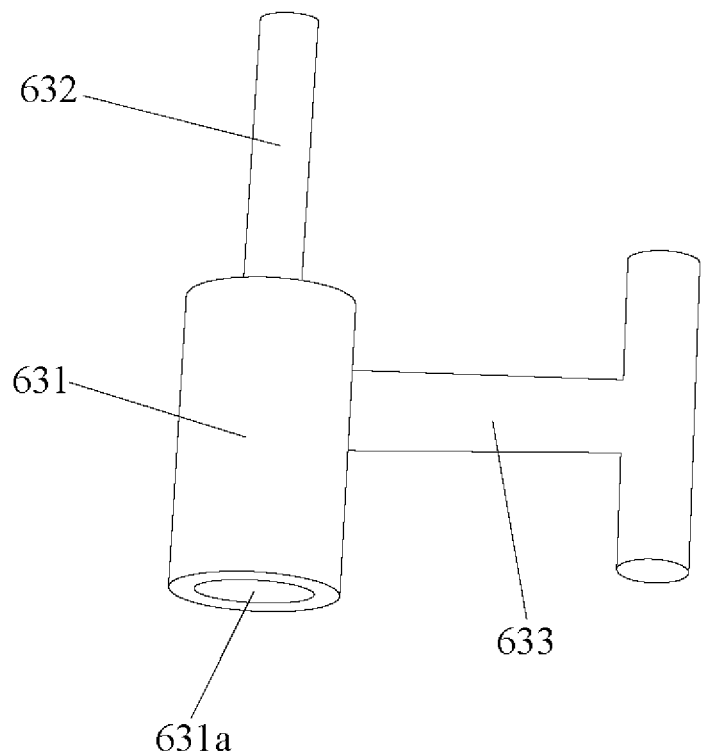
FIG. 5 is a perspective view of a positioning bracket of the magnetic levitation imitation flame device according to an embodiment of the present invention.

As shown in FIGS. 3 and 4, an elongated hole 62a is defined at a lower end of the flame piece 621 so that the positioning shaft 632 passes through the positioning hole 641 to insert into the elongated hole 62a. And the positioning shaft 632 can be viewed from the front of the flame piece 621. Therefore, when the positioning shaft 632 is painted black to form a flame wick. The positioning shaft 632 can be seen from the outside, so the positioning shaft 632 forms a flame wick to achieve flickering flame effect.

Figure 6:
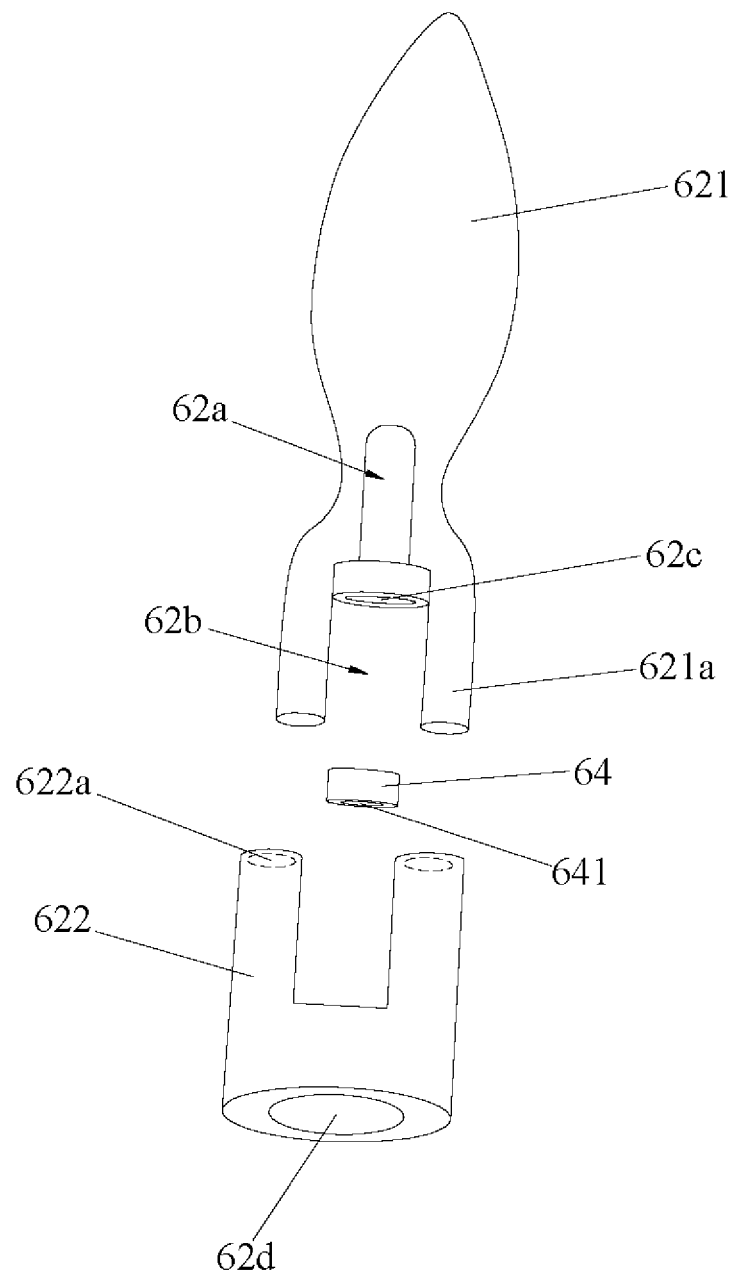
FIG. 6 is a perspective view of a flame member of the magnetic levitation imitation flame device according to another embodiment of the present invention.

As shown in FIG. 6, the flame member 62 includes a flame piece 621 and a rocking part 622. The flame piece 621 extends downwards to form a connection pin 621a. The rocking part 622 is provided with a connection hole 622a, and the connection pin 621a is inserted into the connection hole 622a so that the flame piece 621 is connected with the rocking part 622. An elongated slot 62b is formed between the two connection pins 621a. One end of the elongated slot 62b near the elongated hole 62a is a mounting hole 62c for accommodating the first magnet 64. The supporting rob 631 is placed in the elongated slot 62b so that the flame member 62 can be suspended relative to the supporting rod 631.

As shown in FIG. 1, the drive device 4 includes a third magnet 41 and a coil 42. The third magnet 41 is fixed to the lower end of the flame member 62. Concretely, a bottom surface of the flame member 62 is provided with a fixing hole 62d. In this embodiment, the fixing hole 62d is formed on the bottom of the rocking part 622, and the third magnet 41 is accommodated in the fixing hole 62d. The coil 42 is located under the flame member 62 and generates an electromagnetic field under the control of the circuit board 3 to control the flame member 62 to swing. Specifically, the circuit board 3 controls power-on and power-off of the coil 42. When the coil 42 is energized and generates an electric field to push the third magnet 41 to move, to drive the flame member 62 to swing. At this moment, the coil 42 is powered off, and the flame member 62 continues to swing under the inertia. After a period of time, the coil 42 is reenergized and generates an electric field again, so as to push again. So the third magnet 41 moves, and the flame member 62 will continue swinging.

In comparison with the prior art, a first magnet 64 is disposed on the flame member 62, the flame member 62 is disposed on the positioning bracket 63, and the second magnet 65 is fixed at a lower end of the positioning bracket 63. Magnetic poles of the second magnet 65 and the first magnet 64 facing each other have same polarity so that the flame member 62 is levitated relative to the positioning bracket 63 under a repulsive force of the first magnet 64 and the second magnet 65. Since the flame member 62 is levitated and only controlled by the positioning shaft 632, the flame member 62 can swings with big angle towards all directions. Besides, in the suspended state, the flame member 62 is not blocked by other forces, so the swing is more natural and realistic, and the flame member 62 looks like an actual flaming and flickering candle under a breeze. In addition, each time the flame member 62 is driven to swing, the flame member 62 can swing with inertial force more lastingly, thereby effectively reducing driving, saving energy, extending battery life and protect the environment.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A magnetic levitation imitation flame device, comprising a mounting base, a flame member, a positioning bracket, a first magnet, and a second magnet, wherein the positioning bracket is fixed in the mounting base, the first magnet is disposed on the flame member, the flame member is disposed on the positioning bracket and protrudes outwards from the mounting base, the second magnet is fixed at a lower end of the positioning bracket, the first magnet and the second magnet are arranged up and down, and magnetic poles thereof facing each other have the same polarity so that the flame member is levitated relative to the positioning bracket under a repulsive force of the first magnet and the second magnet, the positioning bracket comprises a supporting rod, a positioning shaft, and a connection frame, the positioning shaft is formed at an upper end of the supporting rod, one end of the connection frame is connected to the supporting rod, and the other end of the connection frame is connected to an inner sidewall of the mounting base, the first magnet is provided with a positioning hole, the positioning shaft is sleeved in the positioning hole of the first magnet, an elongated hole is defined on the flame member, the positioning shaft is passed through the positioning hole to insert into the elongated hole, and the second magnet is arranged on the supporting rod.

2. The magnetic levitation imitation flame device according to claim 1, wherein the second magnet is arranged in an opening of the bottom surface of the supporting rod.

3. The magnetic levitation imitation flame device according to claim 2, wherein the flame member is provided with an elongated slot, one end of the elongated slot is a mounting hole for accommodating the first magnet, and the supporting rod is placed in the elongated slot.

4. The magnetic levitation imitation flame device according to claim 1, wherein the flame member comprises a flame piece and a rocking part, the flame piece extends downwards to form a connection pin, the rocking part is provided with a connection hole, and the connection pin is inserted into the connection hole so that the flame piece is connected with the rocking part.

5. An imitation flame lamp, comprising:
a shell;
a power supply, a circuit board, a drive device, and an illuminant respectively installed in the shell; and
a magnetic levitation imitation flame device installed in the shell, the magnetic levitation imitation flame device comprising a mounting base, a flame member, a positioning bracket, a first magnet, and a second magnet, wherein the positioning bracket is fixed in the mounting base, the first magnet is disposed on the flame member, the flame member is disposed on the positioning bracket and protrudes outwards from the mounting base, the second magnet is fixed at a lower end of the positioning bracket, the first magnet and the second magnet are arranged up and down, and magnetic poles thereof facing each other have the same polarity so that the flame member is levitated relative to the positioning bracket under a repulsive force of the first magnet and the second magnet; the positioning bracket comprises a supporting rod, a positioning shaft, and a connection frame, the positioning shaft is formed at an upper end of the supporting rod, one end of the connection frame is connected to the supporting rod, and the other end of the connection frame is connected to an inner sidewall of the mounting base, the first magnet is provided with a positioning hole, the positioning shaft is sleeved in the positioning hole of the first magnet, an elongated hole is defined on the flame member, the positioning shaft is passed through the positioning hole to insert into the elongated hole, and the second magnet is arranged on the supporting rod;
wherein the flame member is protruded outwards from a top surface of the shell, the circuit board is electrically connected to the power supply through a switch, the illuminant is electrically connected to the circuit board and irradiates light towards the flame member, and the drive device is electrically connected to the circuit board and drives the flame member to swing.

6. The imitation flame lamp according to claim 5, wherein the drive device comprises a third magnet and a coil, the third magnet is fixed to a lower end of the flame member, the coil is located under the flame member and generates an electromagnetic field under the control of the circuit board to control the flame member to swing.

7. The imitation flame lamp according to claim 6, wherein a bottom surface of the flame member is provided with a fixing hole, and the third magnet is accommodated in the fixing hole.

8. The imitation flame lamp according to claim 5, wherein the shell is a candle shell.

* * * * *